United States Patent
Colas et al.

(10) Patent No.: US 9,045,599 B2
(45) Date of Patent: Jun. 2, 2015

(54) AMPHIPHILIC RESIN-LINEAR ORGANOSILOXANE BLOCK COPOLYMERS

(71) Applicant: Dow Corning Corporation, Midland, MI (US)

(72) Inventors: Andre Colas, Rixensart (BE); John Bernard Horstman, Midland, MI (US); Steven Swier, Miidland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/385,589

(22) PCT Filed: Mar. 28, 2013

(86) PCT No.: PCT/US2013/034316
§ 371 (c)(1),
(2) Date: Sep. 16, 2014

(87) PCT Pub. No.: WO2013/148979
PCT Pub. Date: Oct. 3, 2013

(65) Prior Publication Data
US 2015/0051356 A1   Feb. 19, 2015

Related U.S. Application Data

(60) Provisional application No. 61/616,689, filed on Mar. 28, 2012.

(51) Int. Cl.
C08G 77/46      (2006.01)
C08G 77/42      (2006.01)
C08L 83/12      (2006.01)

(52) U.S. Cl.
CPC ............... *C08G 77/46* (2013.01); *C08G 77/42* (2013.01); *C08L 83/12* (2013.01)

(58) Field of Classification Search
None
See application file for complete search history.

(56) References Cited

U.S. PATENT DOCUMENTS

| | | | | |
|---|---|---|---|---|
| 3,328,481 A | * | 6/1967 | Vincent | 525/477 |
| 3,419,593 A | | 12/1968 | Willing | |
| 3,576,905 A | * | 4/1971 | McKellar et al. | 528/34 |
| 3,607,972 A | | 9/1971 | Kiles et al. | |
| 3,619,229 A | * | 11/1971 | Hartlein | 523/209 |
| 3,620,821 A | * | 11/1971 | Johnson | 427/407.3 |
| 3,629,228 A | * | 12/1971 | Hartlein et al. | 528/17 |
| 3,647,846 A | * | 3/1972 | Hartlein et al. | 556/436 |
| 3,670,649 A | * | 6/1972 | Hartlein et al. | 102/431 |
| 3,715,334 A | | 2/1973 | Karstedt | |
| 3,814,730 A | | 6/1974 | Karstedt | |
| 3,923,705 A | | 12/1975 | Smith | |
| 4,013,611 A | * | 3/1977 | Hechtl et al. | 523/212 |
| 4,025,456 A | * | 5/1977 | Litteral et al. | 516/13 |
| 4,419,402 A | * | 12/1983 | Gutek | 442/145 |
| 4,443,502 A | * | 4/1984 | Gutek | 427/387 |
| 5,175,325 A | | 12/1992 | Brown et al. | |
| 5,240,971 A | * | 8/1993 | Eckberg et al. | 522/31 |
| 7,424,648 B2 | | 9/2008 | Honda et al. | |
| 7,553,546 B1 | | 6/2009 | Tan | |
| 7,705,093 B2 | * | 4/2010 | Kashiwagi et al. | 525/474 |
| 7,807,268 B2 | | 10/2010 | Zhou et al. | |
| 8,222,363 B2 | | 7/2012 | Lin et al. | |
| 8,679,581 B2 | | 3/2014 | Xambasivam et al. | |
| 2007/0032595 A1 | * | 2/2007 | Yamakawa et al. | 524/862 |
| 2007/0196309 A1 | * | 8/2007 | Tarletsky et al. | 424/70.12 |
| 2009/0297461 A1 | * | 12/2009 | Perle et al. | 424/59 |
| 2012/0200969 A1 | | 8/2012 | Hirose | |
| 2012/0214010 A1 | | 8/2012 | Kagimoto et al. | |

* cited by examiner

*Primary Examiner* — Robert S Loewe
(74) *Attorney, Agent, or Firm* — John M. Olivo

(57) ABSTRACT

Amphiphilic organosiloxane block copolymers and methods for making them are disclosed. The compositions incorporate an amphiphilic "linear" segment with a "resinous" segment. For example, a polyether (A) modified PDMS (B) with (AB)n architecture and polydiorganosiloxane with Si—H end-groups can be reacted with a phenyl silsesquioxane resin bearing vinyl functionality to form an amphiphilic resin-linear copolymer.

14 Claims, No Drawings

AMPHIPHILIC RESIN-LINEAR ORGANOSILOXANE BLOCK COPOLYMERS

CROSS-REFERENCE TO RELATED APPLICATIONS

This application is a U.S. national stage filing under 35 U.S.C. §371 of PCT Application No. PCT/US 13/34316 filed on 28 Mar. 2013, which claims the benefit of U.S. Provisional Patent Application No. 61/616,689 filed 28 Mar. 2012 under 35 U.S.C. §119 (e). PCT Application No. PCT/US13/34316 and U.S. Provisional Patent Application No. 61/616,689 are hereby incorporated by reference.

BACKGROUND

Resin-linear organosiloxane block copolymers are versatile materials that can be manipulated to certain solid or semi-solid forms. To form such solid or semi-solid materials from resin-linear organosiloxane block copolymers, however, oftentimes additional chemical cross-linking must be effected. Further, there are some limits on the amounts and types of additives that may be included in the resin-linear organosiloxane block copolymers (e.g., additives that contain nitrogen and sulfur moieties), since the presence of such additives may inhibit chemical cure (e.g., platinum-catalyzed hydrosilylation). There is therefore a need for resin linear organosiloxane block copolymers that may require less additional chemical cross linking to form certain solid or semi-solid forms and/or are more amenable to the inclusion of additives that may otherwise negatively impact curing.

SUMMARY

Embodiment 1 relates to a resin-linear organosiloxane block copolymer comprising:
i) a linear block of repeating units having the formula B-[AB]$_n$
wherein:
B is a diorganopolysiloxane having an average of from 10 to 400 disiloxy units of the formula [R$^1_2$SiO$_{2/2}$]
A is a divalent organic group comprising at least one polyether group, and
n is ≥1
ii) a resinous block of repeating units of the formula [R$^2$SiO$_{3/2}$] arranged in non-linear blocks having a molecular weight of at least 500 g/mol,
wherein
R$^1$ is independently a C$_1$ to C$_{30}$ hydrocarbyl,
R$^2$ is independently a C$_1$ to C$_{20}$ hydrocarbyl,
each linear block is linked to at least one non-linear block by a divalent C$_2$ to C$_{12}$ hydrocarbylene group, and
the organosiloxane block copolymer has a molecular weight of at least 20,000 g/mole.
Embodiment 2 relates to the resin-linear organosiloxane of Embodiment 1, wherein the linear block has the formula

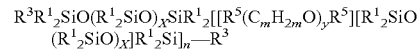

wherein x is ≥0, m is from 2 to 4 inclusive, y is ≥3, n is ≥1,
R$^1$ is independently a monovalent hydrocarbon group containing 1 to 30 carbons, and
R$^5$ is a divalent hydrocarbon containing 2 to 30 carbons.
Embodiment 3 relates to the resin-linear organosiloxane of Embodiment 2, wherein R$^1$ is methyl, R$^5$ is ethylene, propylene, or isobutylene, and m is 2.

Embodiment 4 relates to the resin-linear organosiloxane of Embodiment 2 or 3, wherein R$^2$ is phenyl.
Embodiment 5 relates to a process for preparing a resin linear organosiloxane block copolymer comprising:
I) reacting:
a) a linear organosiloxane of the formula:

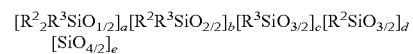

Wherein x is ≥0, m is from 2 to 4 inclusive, y is ≥3, n is ≥1,
R$^1$ is independently a C$_1$ to C$_{30}$ hydrocarbyl,
R$^5$ is a divalent hydrocarbon containing 2 to 30 carbons,
R$^3$ is independently H or R$^4$,
wherein R$^4$ is a C$_2$ to C$_{12}$ hydrocarbyl having at least one aliphatic unsaturated bond;
b) an organosiloxane resin having the average formula;

[R$^2_2$R$^3$SiO$_{1/2}$]$_a$[R$^2$R$^3$SiO$_{2/2}$]$_b$[R$^3$SiO$_{3/2}$]$_c$[R$^2$SiO$_{3/2}$]$_d$ [SiO$_{4/2}$]$_e$ where the subscripts a, b, c, d, and e represent the mole fraction of each siloxy unit present in the organosiloxane resin and range as follows:
a may vary from 0 to 0.7,
b may vary from 0 to 0.3,
c may vary from 0 to 0.8,
d may vary from 0 to 0.9,
e may vary from 0 to 0.7,
with the provisos that a+b+c>0, c+d+e≥0.6, and a+b+c+d+e≈1, with the proviso at least one R$^3$ substituent is H on either of the linear organosiloxane or organosiloxane resin, and one R$^3$ substituent is R$^4$ on the other organosiloxane, and
c) a hydrosilylation catalyst;
to form a resin-linear organosiloxane block copolymer;
wherein the amounts of a) and b) used in step I are selected to provide the resin-linear organosiloxane block copolymer with 10 to 90 mol % of disiloxy units [R$^1_2$SiO$_{2/2}$]$_{and}$ 10 to 70 mol % of [R$^2$SiO$_{3/2}$] or [SiO$_{4/2}$] siloxy units, and
at least 95 weight percent of the linear organosiloxane added in step I is incorporated into the resin-linear organosiloxane block copolymer.
Embodiment 6 relates to the process of Embodiment 5, further comprising a solvent.
Embodiment 7 relates to the process of Embodiment 5 further comprising:
II) reacting the resin-linear organosiloxane block copolymer from step I) to crosslink the [R$^2$SiO$_{3/2}$] and/or [SiO$_{4/2}$] siloxy units of the resin-linear organosiloxane block copolymer sufficiently to increase the average molecular weight (M$_w$) of the resin-linear organosiloxane block copolymer by at least 50%.
Embodiment 8 relates to the process of Embodiments 5-7, wherein R$^1$ is methyl, R$^5$ is ethylene, propylene, or isobutylene, and m is 2.
Embodiment 9 relates to the process of Embodiments 5-8, wherein R$^2$ is phenyl.
Embodiment 10 relates to the resin linear organosiloxane block copolymer as prepared by Embodiments 5-9.
Embodiment 11 relates to a solid composition comprising the resin linear organosiloxane of Embodiments 1-4 or 10.
Embodiment 12 relates to the solid composition of Embodiment 11, wherein the solid has a storage modulus (G') at 25° C. of at least 1 KPa.
Embodiment 13 relates to the solid composition of Embodiment 12 having a water vapor permeation rate of at least 30 g/m$^2$·day.

Embodiment 14 relates to the solid composition of Embodiment 11, which is curable.

Embodiment 15 relates to the cured product of the composition of Embodiment 14.

DESCRIPTION

The present disclosure relates to amphiphilic organosiloxane block copolymers and methods for making them. The compositions incorporate an amphiphilic "linear" portion and a "resinous" portion, where the linear portion contains a polyether block and a polydiorganosiloxane block. An example of such a block copolymer includes a polyether-modified polydiorganosiloxane having the general formula $(AB)_n$, where A may correspond to the polyether block and B may correspond to a polydiorganosiloxane block having, e.g., Si—H end-groups, that can be reacted with a silicone resin (e.g., silsesquioxane) bearing at least one unsaturated carbon-carbon double bond (e.g., a vinyl group) to give an amphiphilic resin-linear organosiloxane block copolymer. Such amphiphilic organosiloxane block copolymers are soluble in organic solvents and can be processed by heat. The amphiphilic nature can be used to improve the solubility of hydrophilic pharmaceutical actives into the siloxane matrix.

In some embodiments, depending on the nature of the resinous portions present in the amphiphilic organosiloxane block copolymers of the examples provided herein, those resinous portions may have physical cross-link points, such that the amphiphilic organosiloxane block copolymers can form elastomers, gels, or films at room temperature, without the need for any additional chemical cross-linking.

Additional benefits of the amphiphilic organosiloxane block copolymers described herein include the ability to introduce additives, such as active pharmaceutical ingredients, that would otherwise inhibit chemical cure because they contain nitrogen and sulfur moieties. Such moieties are known to inhibit platinum catalyzed hydrosilylation. Additional benefits of the amphiphilic organosiloxane block copolymers include the control of the glass transition of the resin phase, which can be tuned to reside below, at, or above room temperature. For example, a glass transition above room temperature can be used to form a tack-free film, while a glass transition below or close to room temperature could be used to tune tack for certain applications. The present process also provides compositions that form optically clear materials due to the chemical grafting of the amphiphilic flexible blocks with the aryl-containing resinous hard blocks. In some instances, it has proven difficult to obtain optically clear silicone-containing materials that also incorporate, e.g., ethylene oxide moieties.

The present disclosure relates to resin-linear organosiloxane block copolymers comprising:
i) a linear block of repeating units having the formula B-[AB]$_n$
wherein:
A is a divalent organic group comprising at least one polyether group,
B is a diorganopolysiloxane having an average of from 10 to 400 disiloxy units of the formula $[R^1{}_2SiO_{2/2}]$, and n is ≥1;
ii) a resinous block of repeating units of the formula $[R^2SiO_{3/2}]$ arranged in non-linear blocks having a molecular weight of at least 500 g/mol,
wherein:
$R^1$ is independently a $C_1$ to $C_{30}$ hydrocarbyl,
$R^2$ is independently a $C_1$ to $C_{20}$ hydrocarbyl, each linear block is linked to at least one non-linear block by a divalent $C_2$ to $C_{12}$ hydrocarbylene group; and
the organosiloxane block copolymer has a molecular weight of at least 20,000 g/mole.

As used herein, the term "$C_2$ to $C_{12}$ hydrocarbylene" refers broadly to any $C_2$ to $C_{12}$ (e.g., $C_2$ to $C_6$; $C_3$ to $C_8$; or $C_4$ to $C_{12}$) hydrocarbon having two free valences. Such hydrocarbons include, but are not limited to, alkylene groups, including, but not limited to —H$_2$CCH$_2$—, —H$_2$CCH$_2$CH$_2$—, —H$_2$CHC(CH$_3$)CH$_2$—, —H$_2$CCH$_2$C(CH$_3$)$_2$—, —H$_2$CCH$_2$CH$_2$CH$_2$—, —H$_2$CCH$_2$CH$_2$CH$_2$CH$_2$—, and —H$_2$CCH$_2$CH$_2$CH$_2$CH$_2$CH$_2$—; and arylene groups, including, but not limited to phenylene groups (e.g., a phenyl group having two open valences); or combinations of alkylene and arylene groups (e.g., an alkylene-arylene group, where the alkylene group is connected to the arylene group and the alkylene and the arylene groups each have an open valence). In some embodiments, the hydrocarbylene group is a $C_2$ to $C_{12}$ hydrocarbylene group. In some embodiments, the $C_2$ to $C_{12}$ hydrocarbylene group is —CH$_2$CH$_2$—.

The organopolysiloxanes of the embodiments described herein as "resin-linear" organosiloxane block copolymers. Organopolysiloxanes are polymers containing siloxy units independently selected from $(R_3SiO_{1/2})$, $(R_2SiO_{2/2})$, $[RSiO_{3/2}]$, or $[SiO_{4/2}]$ siloxy units, where R may be, e.g., an organic group. These siloxy units are commonly referred to as M, D, T, and Q units respectively. These siloxy units can be combined in various manners to form cyclic, linear, or branched structures. The chemical and physical properties of the resulting polymeric structures vary depending on the number and type of siloxy units in the organopolysiloxane. For example, "linear" organopolysiloxanes may contain mostly D, or $[R_2SiO_{2/2}]$ siloxy units, which results in polydiorganosiloxanes that are fluids of varying viscosities, depending on the "degree of polymerization" or "dp" as indicated by the number of D units in the polydiorganosiloxane. "Linear" organopolysiloxanes may have glass transition temperatures ($T_g$) that are lower than 25° C. "Resin" organopolysiloxanes result when a majority of the siloxy units are selected from T or Q siloxy units. When T siloxy units are predominately used to prepare an organopolysiloxane, the resulting organosiloxane is often referred to as a "resin" or a "silsesquioxane resin." Increasing the amount of T or Q siloxy units in an organopolysiloxane may result in polymers having increasing hardness and/or glass like properties. "Resin" organopolysiloxanes thus have higher $T_g$ values, for example siloxane resins often have $T_g$ values greater than 40° C., e.g., greater than 50° C., greater than 60° C., greater than 70° C., greater than 80° C., greater than 90° C. or greater than 100° C. In some embodiments, $T_g$ for siloxane resins is from about 60° C. to about 100° C., e.g., from about 60° C. to about 80° C., from about 50° C. to about 100° C., from about 50° C. to about 80° C. or from about 70° C. to about 100° C.

As used herein "resin-linear organosiloxane block copolymers" refer to organopolysiloxanes containing "linear" blocks of repeating D siloxy units and polyether units in combination with "resin" T siloxy units. The present organosiloxane copolymers are "block" copolymers, as opposed to "random" copolymers.

The "linear blocks" of the present resin-linear (RL) organosiloxane block copolymers contain -B[AB]$_n$- silicone polyether copolymers having repeating units of A, a divalent organic group containing at least one polyether group, and B, a diorganopolysiloxane. The subscript n represents on average the number repeating units of [AB] in the copolymer, and n is ≥1, e.g., ≥2, ≥4 or ≥8. Alternatively, n ranges from about 1 to about 50, e.g., from about 1 to about 10, from about 1 to about 20, from about 1 to about 30, from about 1 to about 40, from about 10 to about 20, from about 10 to about 30, from about 10 to about 40, from about 10 to about 40, from about 10 to about 50, from about 25 to about 35 or from about 25 to about 50.

The divalent organic group containing at least one polyether group, designated as A, comprises at least one polyether group. As used herein, "polyether" designates a polyoxyalkylene group. The polyoxyalkylene group may be represented by the formula $(C_mH_{2m}O)_y$, wherein m is from about 2 to about 4 inclusive, and y is greater than about 3, e.g., greater than about 4 or, alternatively, y may range from about 4 to about 60, e.g., from about 5 to about 30, from about 4 to about 30, from about 4 to about 15, from about 5 to about 50, from about 10 to about 50, from about 15 to about 50, from about 20 to about 50, from about 20 to about 60, from about 40 to about 60 or from about 30 to about 60. The polyoxyalkylene group may comprise oxyethylene units $(C_2H_4O)$, oxypropylene units $(C_3H_6O)$, oxybutylene units $(C_4H_8O)$, or combinations thereof. In some embodiments, the polyoxyalkylene group comprises oxyethylene units $(C_2H_4O)$ or combinations of oxyethylene units and oxypropylene units.

The linear block of repeating units having the formula $B-[AB]_n$ also contains a diorganopolysiloxane, designated as B. The diorganopolysiloxane has an average of from 10 to 400 disiloxy units of the formula $[R^1_2SiO_{2/2}]$ (e.g., an average of from about 10 to about 350 D units; about 10 to about 300 D units; about 10 to about 200 D units; about 10 to about 100 D units; about 50 to about 400 D units; about 100 to about 400 D units; about 150 to about 400 D units; about 200 to about 400 D units; about 300 to about 400 D units; about 50 to about 300 D units; about 100 to about 300 D units; about 150 to about 300 D units; about 200 to about 300 D units; about 100 to about 150 D units, about 115 to about 125 D units, about 90 to about 170 D units or about 110 to about 140 D units).

At each occurrence, each $R^1$ in the above disiloxy unit is independently a $C_1$ to $C_{30}$ hydrocarbyl, where the hydrocarbyl group may independently be an alkyl, aryl, or alkylaryl group. Each $R^1$, at each occurrence, may independently be a $C_1$ to $C_{30}$ alkyl group, alternatively, at each occurrence, each $R^1$ may be a $C_1$ to $C_{18}$ alkyl group. Alternatively each $R^1$, at each occurrence, may be a $C_1$ to $C_6$ alkyl group such as methyl, ethyl, propyl, butyl, pentyl, or hexyl. Alternatively each $R^1$, at each occurrence, may be methyl. Each $R^1$, at each occurrence, may be an aryl group, such as phenyl, naphthyl, or an anthryl group. Alternatively, each $R^1$, at each occurrence, may be any combination of the aforementioned alkyl or aryl groups such that, in some embodiments, each disiloxy unit may have two alkyl groups (e.g., two methyl groups); two aryl groups (e.g., two phenyl groups); or an alkyl (e.g., methyl) and an aryl group (e.g., phenyl). Alternatively, each $R^1$, at each occurrence, is phenyl or methyl.

As used throughout the specification, hydrocarbyl also includes substituted hydrocarbyls. "Substituted" as used throughout the specification refers broadly to replacement of one or more of the hydrogen atoms of the group with substituents known to those skilled in the art and resulting in a stable compound as described herein. Examples of suitable substituents include, but are not limited to, alkyl, alkenyl, alkynyl, cycloalkyl, aryl, alkaryl, hydroxy, alkoxy, aryloxy, carboxy (i.e., $CO_2H$), carboxyalkyl, carboxyaryl, cyano, nitro and the like. Substituted hydrocabyl also includes halogen substituted hydrocarbyls, where the halogen may be fluorine, chlorine, bromine or combinations thereof.

In one embodiment, the linear block comprises a silicone polyether copolymer that may be represented by the average formula:

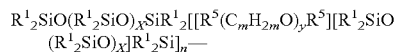

$R^1_2SiO(R^1_2SiO)_xSiR^1_2[[R^5(C_mH_{2m}O)_yR^5][R^1_2SiO(R^1_2SiO)_x]R^1_2Si]_n$— wherein: each x is independently ≥0 (e.g., greater than 1, greater than 2, greater than 4, greater than 8, greater than 25, greater than 50, greater than 100, from about 2 to about 100, from about 2 to about 50, from about 10 to about 100, from about 10 to about 50, from about 25 to about 100, from about 50 to about 100 or from about 25 to about 75); each m is independently from 2 to 4 inclusive; each y is independently ≥4; n is ≥1; $R^1$ is as defined herein; and each $R^5$ is independently a divalent hydrocarbon containing 2 to 30 carbon atoms.

In some embodiments, at least one end of each polyether block A is linked to a silicone block B by a divalent hydrocarbon group, designated $R^5$. This linkage is determined by the reaction employed to prepare the $-B[AB]_n$-block silicone polyether copolymer. The divalent hydrocarbon group $R^5$ may be independently selected from divalent hydrocarbon groups (linear or branched) containing about 2 to about 12 carbon atoms, e.g., from about 2 to about 4 carbon atoms, from about 2 to about 6 carbon atoms, from about 3 to about 6 carbon atoms, from about 2 to about 8 carbon atoms, or from about 6 to about 8 carbon atoms. Representative, non-limiting examples of such divalent hydrocarbon groups include ethylene, propylene, butylene, isobutylene, pentylene, hexylene, heptylene, octylene, and the like. Representative, non-limiting examples of such divalent organofunctional hydrocarbons groups include acrylate and methacrylate. In some embodiments, each $R^5$ is independently ethylene or propylene ($-CH_2CH_2CH_2-$), or isobutylene ($-CH_2CH(CH_3)CH_2-$).

In some embodiments $R^5$ may be a $C_2$ to $C_{12}$ hydrocarbylene, as the term is defined herein.

The resin-linear organosiloxane block copolymers contain a resinous block of repeating units of the formula $[R^2SiO_{3/2}]$ arranged in non-linear blocks having a number average molecular weight of at least 500 g/mol (e.g., at least 1000 g/mole, at least 2000 g/mole, at least 3000 g/mole or at least 4000 g/mole; or have a molecular weight of from about 500 g/mole to about 4000 g/mole, from about 500 g/mole to about 3000 g/mole, from about 500 g/mole to about 2000 g/mole, from about 500 g/mole to about 1000 g/mole, from about 1000 g/mole to about 2000 g/mole, from about 1000 g/mole to about 1500 g/mole, from about 1000 g/mole to about 1200 g/mole, from about 1000 g/mole to 3000 g/mole, from about 1000 g/mole to about 2500 g/mole, from about 1000 g/mole to about 4000 g/mole, from about 2000 g/mole to about 3000 g/mole or from about 2000 g/mole to about 4000 g/mole).

Each $R^2$, at each occurrence, in the above trisiloxy unit is independently a $C_1$ to $C_{20}$ hydrocarbyl, where the hydrocarbyl group may independently be an alkyl, aryl, or alkylaryl group. Each $R^2$, at each occurrence, may be a $C_1$ to $C_{20}$ alkyl group, alternatively each $R^2$, at each occurrence, may be a $C_1$ to $C_{18}$ alkyl group. Alternatively each $R^2$, at each occurrence, may be a $C_1$ to $C_6$ alkyl group such as methyl, ethyl, propyl, butyl, pentyl, or hexyl. Alternatively each $R^2$, at each occurrence, may be methyl. Each $R^2$, at each occurrence, may be an aryl group, such as phenyl, naphthyl, or an anthryl group. Alternatively, each $R^2$, at each occurrence, may be any combination of the aforementioned alkyl or aryl groups such that, in some embodiments, each disiloxy unit may have two alkyl groups (e.g., two methyl groups); two aryl groups (e.g., two phenyl groups); or an alkyl (e.g., methyl) and an aryl group (e.g., phenyl). Alternatively, each $R^2$, at each occurrence, is phenyl or methyl.

The amount of linear and resinous blocks in the resin-linear organosiloxane block copolymer may vary. In some embodiments, the resin-linear organosiloxane block copolymer contains sufficient amounts of the resinous block to provide 10-70 mole percent trisiloxy units, or alternatively 20-60 mole percent trisiloxy units, or alternatively 10 to 20 mole percent trisiloxy units; 10 to 30 mole percent trisiloxy units; 10 to 35 mole percent trisiloxy units; 10 to 40 mole percent trisiloxy units; 10 to 50 mole percent trisiloxy units; 20 to 30 mole percent trisiloxy units; 20 to 35 mole percent trisiloxy units; 20 to 40 mole percent trisiloxy units; 20 to 50 mole percent trisiloxy units; 30 to 40 mole percent trisiloxy units; 30 to 50 mole percent trisiloxy units; 30 to 60 mole percent trisiloxy units; 40 to 50 mole percent trisiloxy units; or 40 to 60 mole percent trisiloxy units, of the total siloxy units present in the resin-linear organosiloxane block copolymer.

The mole fractions of the various siloxy units in the present organosiloxane block copolymers may be readily determined by $^{29}$Si NMR techniques.

In some embodiments, the amounts of the linear and resinous blocks in the resin-linear organosiloxane copolymer may be reported in weight percent of the resin component. For example, the resin-linear organosiloxane block copolymer contains sufficient amounts of the resinous block to provide 10 to 90 wt. %, alternatively 20 to 70 wt. %, or alternatively 20 to 60 wt. % of the resinous block in the resin-linear organosiloxane block copolymer.

In some embodiments, the resin-linear organosiloxane block copolymers have a weight average molecular weight ($M_W$) of at least 20,000 g/mole, alternatively a weight average molecular weight of at least 40,000 g/mole, alternatively a weight average molecular weight of at least 50,000 g/mole, alternatively a weight average molecular weight of at least 60,000 g/mole, alternatively a weight average molecular weight of at least 70,000 g/mole, or alternatively a weight average molecular weight of at least 80,000 g/mole. In some embodiments, the resin linear organosiloxane block copolymers of the embodiments described herein have a weight average molecular weight (Mw) of from about 20,000 g/mole to about 250,000 g/mole or from about 100,000 g/mole to about 250,000 g/mole, alternatively a weight average molecular weight of from about 40,000 g/mole to about 100,000 g/mole, alternatively a weight average molecular weight of from about 50,000 g/mole to about 100,000 g/mole, alternatively a weight average molecular weight of from about 50,000 g/mole to about 80,000 g/mole, alternatively a weight average molecular weight of from about 50,000 g/mole to about 70,000 g/mole, alternatively a weight average molecular weight of from about 50,000 g/mole to about 60,000 g/mole. In some embodiments, the organosiloxane block copolymers of the embodiments described herein have a number average molecular weight ($M_n$) of from about 15,000 to about 50,000 g/mole; from about 15,000 to about 30,000 g/mole; from about 20,000 to about 30,000 g/mole; or from about 20,000 to about 25,000 g/mole. The average molecular weight may be readily determined using Gel Permeation Chromatography (GPC) techniques.

In some embodiments, the structural ordering of the disiloxy and trisiloxy units may be further described as follows: the disiloxy units and polyether units are arranged in linear blocks having an average of from 10 to 400 disiloxy units per linear block, and the trisiloxy units are arranged in non-linear blocks having a molecular weight of at least 500 g/mole (e.g., at least 1000 g/mole, at least 2000 g/mole, at least 3000 g/mole or at least 4000 g/mole; or have a molecular weight of from about 500 g/mole to about 4000 g/mole, from about 500 g/mole to about 3000 g/mole, from about 500 g/mole to about 2000 g/mole, from about 500 g/mole to about 1000 g/mole, from about 1000 g/mole to 2000 g/mole, from about 1000 g/mole to about 1500 g/mole, from about 1000 g/mole to about 1200 g/mole, from about 1000 g/mole to about 3000 g/mole, from about 1000 g/mole to about 2500 g/mole, from about 1000 g/mole to about 4000 g/mole, from about 2000 g/mole to about 3000 g/mole or from about 2000 g/mole to about 4000 g/mole). Each linear block is linked to at least one non-linear block in the block copolymer. Furthermore, at least 30% of the non-linear blocks are crosslinked with each other, alternatively at least at 40% of the non-linear blocks are crosslinked with each other, alternatively at least at 50% of the non-linear blocks are crosslinked with each other.

In other embodiments, from about 30% to about 80% of the non-linear blocks are crosslinked with each other; from about 30% to about 70% of the non-linear blocks are crosslinked with each other; from about 30% to about 60% of the non-linear blocks are crosslinked with each other; from about 30% to about 50% of the non-linear blocks are crosslinked with each other; from about 30% to about 40% of the non-linear blocks are crosslinked with each other; from about 40% to about 80% of the non-linear blocks are crosslinked with each other; from about 40% to about 70% of the non-linear blocks are crosslinked with each other; from about 40% to about 60% of the non-linear blocks are crosslinked with each other; from about 40% to about 50% of the non-linear blocks are crosslinked with each other; from about 50% to about 80% of the non-linear blocks are crosslinked with each other; from about 50% to about 70% of the non-linear blocks are crosslinked with each other; from about 50% to about 60% of the non-linear blocks are crosslinked with each other; from about 60% to about 80% of the non-linear blocks are crosslinked with each other; or from about 60% to about 70% of the non-linear blocks are crosslinked with each other.

The crosslinking reaction of the non-linear blocks may be accomplished via a variety of chemical mechanisms and/or moieties. For example, crosslinking of non-linear blocks within the block copolymer may result from the condensation of residual silanol groups present in the non-linear blocks of the copolymer and/or via hydrosylilation between, e.g., Si—H bonds and unsaturation present on the non-linear blocks. Crosslinking of the non-linear blocks within the block copolymer may also occur between "free resin" components and the non-linear blocks via silanol condensation and/or hydrosilylation. "Free resin" components may be present in the block copolymer compositions as a result of using an excess amount of an organosiloxane resin during the preparation of the block copolymer. The free resin component may crosslink with the non-linear blocks by condensation of the residual silanol groups present on the non-blocks and on the free resin. The free resin may provide crosslinking by reacting with lower molecular weight compounds added as crosslinkers. The free resin, when present, may be present in an amount of from about 10% to about 20% by weight of the organosiloxane block copolymers of the embodiments described herein, e.g., from about 15% to about 20% by weight organosiloxane block copolymers of the embodiments described herein. The free resin may provide crosslinking by reacting with lower molecular weight compounds added as crosslinkers.

Alternatively, certain compounds may have been added during the preparation of the block copolymer to specifically crosslink the non-resin blocks, as discussed herein.

The organosiloxane block copolymers may be prepared by the methods as described further below in this disclosure. Representative examples of their preparation are also detailed in the Examples section below.

In some embodiments, the disclosure provides a process for preparing resin-linear organosiloxane block copolymers that comprises:

I) reacting
a) a linear organosiloxane having the formula

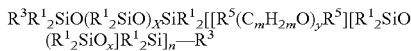

wherein:
each x is independently ≥0; each m is independently from 2 to 4 inclusive; each y is independently ≥4; n is ≥1;
each $R^1$, at each occurrence, is independently a $C_1$ to $C_{30}$ hydrocarbyl,
each $R^5$, at each occurrence, is independently a divalent hydrocarbon containing 2 to 30 carbon atoms, and
each $R^3$, at each occurrence, is independently H or $R^4$, wherein each $R^4$, at each occurrence, is independently a $C_2$ to $C_{12}$ hydrocarbyl group having at least one aliphatic unsaturated bond;
b) an organosiloxane resin having the average formula:

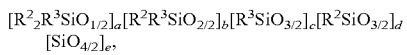

wherein:
each $R^2$, at each occurrence, is independently a $C_1$ to $C_{20}$ hydrocarbyl,
each $R^3$, at each occurrence, is independently H or $R^4$, wherein each $R^4$, at each occurrence, is independently a $C_2$ to $C_{12}$ hydrocarbyl group having at least one aliphatic unsaturated bond, the subscripts a, b, c, d, and e represent the mole fraction of each siloxy unit present in the organosiloxane resin and range as follows:
a is about 0 to about 0.7 or about 0 to about 0.3,
b is about 0 to about 0.3 or about 0 to about 0.2,
c is about 0 to about 0.8 or about 0 to about 0.3,
d is about 0 to about 0.9 or about 0.4 to about 0.9,
e is about 0 to about 0.7 or about 0 to about 0.4,
with the provisos that a+b+c>0, c+d+e≥0.6, and a+b+c+d+e≈1,
with the proviso that at least one $R^3$ substituent is H on either of the linear organosiloxane or organosiloxane resin, and at least one $R^3$ substituent is $R^4$ on the other organosiloxane; and
c) a hydrosilylation catalyst;
in an organic solvent;
to form a resin-linear organosiloxane block copolymer;
wherein the amounts of a) and b) used in step I) are selected to provide the resin-linear organosiloxane block copolymer with 10 to 90 mole % of disiloxy units [$R^1_2SiO_{2/2}$] and 10 to 70 mole % of [$R^2SiO_{3/2}$] and/or [$SiO_{4/2}$] siloxy units, and
wherein at least 95 weight percent of the linear organosiloxane added in step I) is incorporated into the resin-linear organosiloxane block copolymer; and II) optionally reacting the resin-linear organosiloxane block copolymer from step I) to crosslink the [$R_2SiO_{3/2}$] and/or [$SiO_{4/2}$] siloxy units of the resin-linear organosiloxane block copolymer sufficiently to increase the weight average molecular weight ($M_W$) of the resin-linear organosiloxane block copolymer by at least 50%.

The linear organosiloxane (a) used in step I may be prepared according the methods described in WO2008/127519, which is hereby incorporated by reference in its entirety. For example, the linear organosiloxane may be prepared by reacting A) a polyoxyalkylene having an unsaturated hydrocarbon group at each terminal end of the polyoxyalkylene and B) a Si—H terminated organopolysiloxane, in the presence of C) a hydrosilylation catalyst and, optionally, D) an optional solvent.

A. The Polyoxyalkylene

The polyoxyalkylene useful in the process of the present invention can be any polyoxyalkylene group having an unsaturated hydrocarbon group at each terminal end (i.e., alpha and omega positions). The polyoxyalkylene may result from the polymerization of ethylene oxide, propylene oxide, butylene oxide, 1,2-epoxyhexane, 1,2-epoxyoctane, cyclic epoxides such as cyclohexene oxide or exo-2,3-epoxynorborane.

Alternatively, the polyoxyalkylene may be represented by the formula $(C_mH_{2m}O)_y$, wherein m is from about 2 to about 4 inclusive, and y is greater than about 3, e.g., greater than about 4 or, alternatively, y may range from about 4 to about 60, e.g., from about 5 to about 30, from about 4 to about 30, from about 4 to about 15, from about 5 to about 50, from about 10 to about 50, from about 15 to about 50, from about 20 to about 50, from about 20 to about 60, from about 40 to about 60 or from about 30 to about 60. The polyoxyalkylene group may comprise oxyethylene units ($C_2H_4O$), oxypropylene units ($C_3H_6O$), oxybutylene units ($C_4H_8O$), or combinations thereof. In some embodiments, the polyoxyalkylene group comprises oxyethylene units ($C_2H_4O$) or combinations of oxyethylene units and oxypropylene units.

The unsaturated organic group comprises alkenyl or alkynyl groups. Representative, non-limiting examples of the alkenyl groups are shown by the following structures: $H_2C=CH-$, $H_2C=CHCH_2-$, $H_2C=C(CH_3)CH_2-$, $H_2C=CHCH_2CH_2-$, $H_2C=CHCH_2CH_2CH_2-$, and $H_2C=CHCH_2CH_2CH_2CH_2-$. Representative, non-limiting examples of alkynyl groups are shown by the following structures: $HCC-$, $HC\equiv CCH_2-$, $HC\equiv CC(CH_3)-$, $HC\equiv CC(CH_3)_2-$, and $HC\equiv CC(CH_3)_2CH_2-$.

Alternatively, the unsaturated organic group can be an organofunctional hydrocarbon such as an acrylate ($H_2C=CH-C(O)-$), methacrylate ($H_2C=C(CH_3)-C(O)-$) and the like.

The polyoxyalkylene may be selected from those having the average formula:

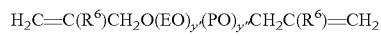

wherein:
y' is ≥1, alternatively y' is 0 to 60 (e.g., from about 4 to 60, from about 4 to about 30, from about 4 to about 15, from about 1 to about 10, from about 1 to about 20, from about 1 to about 30, from about 10 to about 60, from about 20 to about 60 from about 30 to about 60, from about 10 to about 50, from about or from about 30 to about 60);
y" is ≥0, alternatively y" is 0 to 60 (e.g., from about 0 to about 10, from about 0 to about 20, from about 0 to about 30, from about 0 to about 15, from about 10 to about 60, from about 20 to about 60 from about 30 to about 60, from about 10 to about 50, from about or from about 30 to about 60);
with the proviso that y'+y"≥4 (e.g., y'+y" may range from about 4 to about 60, from about 5 to about 30, from about 4 to about 30, from about 4 to about 15, from about 5 to about 50, from about 10 to about 50, from about 15 to about 50, from about 20 to about 50, from about 20 to about 60, from about 40 to about 60 or from about 30 to about 60);

R⁶ is hydrogen or an alkyl group containing 1 to 6 carbon atoms (e.g., from about 2 to about 4 carbon atoms, from about 1 to about 5 carbon atoms or from about 3 to about 6 carbon atoms;

EO is —CH₂CH₂O—; and

PO is —CH₂CH(Me)O— or —CH₂CH₂CH₂O—.

Polyoxyalkylenes having an unsaturated aliphatic hydrocarbon group at each molecular terminal are known in the art, and many are commercially available. Representative, non-limiting examples of polyoxyalkylenes include:

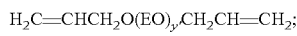

$H_2C=CHCH_2O(EO)_{y'}CH_2CH=CH_2;$

$H_2C=C(Me)CH_2O(EO)_{y'}CH_2C(Me)=CH_2;$

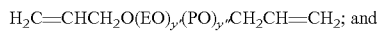

$H_2C=CHCH_2O(EO)_{y'}(PO)_{y''}CH_2CH=CH_2;$ and

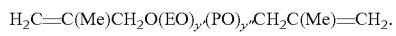

$H_2C=C(Me)CH_2O(EO)_{y'}(PO)_{y''}CH_2C(Me)=CH_2.$ wherein:

y' is ≥1, alternatively y' is 0 to 60 (e.g., from about 4 to 60, from about 4 to about 30, from about 4 to about 15, from about 1 to about 10, from about 1 to about 20, from about 1 to about 30, from about 10 to about 60, from about 20 to about 60 from about 30 to about 60, from about 10 to about 50, from about or from about 30 to about 60);

y″ is ≥0, alternatively y″ is 0 to 60 (e.g., from about 0 to about 10, from about 0 to about 20, from about 0 to about 30, from about 0 to about 15, from about 10 to about 60, from about 20 to about 60 from about 30 to about 60, from about 10 to about 50, from about or from about 30 to about 60);

Me is methyl,

EO is —CH₂CH₂O—; and

PO is —CH₂CH(Me)O— or —CH₂CH₂CH₂O—.

Polyoxyalkylenes having an unsaturated aliphatic hydrocarbon group at each molecular terminal are commercially available from NOF (Nippon Oil and Fat, Tokyo, Japan) and Clariant Corp. (Charlottesville, N.C.).

B) the SiH Terminated Organopolysiloxane

The Si—H terminated organopolysiloxanes useful in the process of the present invention can be represented by the formula M'DM', where "M'" means a siloxane unit of formula $R^1_2HSiO_{1/2}$, "D" means a siloxane unit of formula $R^1_2SiO_{2/2}$, wherein each $R^1$ at each occurrence is a $C_1$ to $C_{30}$ hydrocarbyl group. In some embodiments, the Si—H terminated organopolysiloxane is a dimethylhydrogensiloxy-terminated polydimethylsiloxane having the average formula Me₂HSiO(Me₂SiO)$_x$SiHMe₂, where x is ≥1.0 (e.g., greater than 1, greater than 2, greater than 4, greater than 8, greater than 25, greater than 50, greater than 100, from about 2 to about 100, from about 2 to about 50, from about 10 to about 100, from about 10 to about 50, from about 25 to about 100, from about 50 to about 100 or from about 25 to about 75). Si—H terminated organopolysiloxanes and methods for their preparation are well known in the art.

C) the Hydrosilylation Catalyst

The Si—H terminated organopolysiloxane and polyoxyethylene having an unsaturated organic group at each terminal end are reacted in the presence of a hydrosilylation catalyst, which are known in the art. Hydrosilylation reactions are well known in the art and involves the reaction between a polysiloxane containing ≡Si—H groups, and a compound containing unsaturation, e.g., vinyl groups. In some embodiments, the reaction uses a catalyst to effect the reaction between the ≡Si—H containing polysiloxane and the compound containing unsaturation. The hydrosilylation catalyst may be any suitable Group VIII metal based catalyst selected from a platinum, rhodium, iridium, palladium or ruthenium. Group VIII group metal containing catalysts useful to catalyze the hydrosilylation reaction can be any catalyst known to catalyze reactions of silicon bonded hydrogen atoms with silicon bonded moieties comprising unsaturated hydrocarbon groups. In some embodiments, the Group VIII metal for use as a catalyst to effect the hydrosilylation is a platinum based catalyst such as platinum metal, platinum compounds and platinum complexes.

Suitable platinum catalysts include, but are not limited to, the catalyst described in U.S. Pat. No. 2,823,218 (e.g., "Speier's catalyst") and U.S. Pat. No. 3,923,705, the entireties of both of which are incorporated by reference as if fully set forth herein. Other suitable platinum catalysts include, but are not limited to, the platinum catalyst referred to as "Karstedt's catalyst," which are described in U.S. Pat. Nos. 3,715,334 and 3,814,730. Karstedt's catalyst is a platinum divinyl tetramethyl disiloxane complex, in some cases, containing about one-weight percent of platinum in a solvent such as toluene. Alternatively platinum catalysts include, but are not limited to, the reaction product of chloroplatinic acid and an organosilicon compound containing terminal aliphatic unsaturation, including the catalysts described in U.S. Pat. No. 3,419,593, the entirety of which is incorporated by reference as if fully set forth herein. Alternatively, hydrosilyation catalysts include, but are not limited to, neutralized complexes of platinum chloride and divinyl tetramethyl disiloxane, as described in U.S. Pat. No. 5,175,325. Further suitable hydrosilylation catalysts are described in, for example, U.S. Pat. Nos. 3,159,601; 3,220,972; 3,296,291; 3,516,946; 3,989,668; 4,784,879; 5,036,117; and 5,175,325 and EP 0 347 895 B1.

The hydrosilylation catalyst may be added in an amount of from 0.00001-0.5 parts per 100 weight parts of the ≡Si—H containing polysiloxane. Alternatively, the catalyst should be used in an amount sufficient to provide 0.1-15 parts per million (ppm) Pt metal per total composition.

D) the Optional Solvent

The hydrosilylation reaction may be conducted neat or in the presence of a solvent. The solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride, chloroform, dimethyl sulfoxide, dimethyl formamide, acetonitrile, tetrahydrofuran, white spirits, mineral spirits, or naphtha. Combinations of one or more of the aforementioned solvents are also contemplated.

The amount of solvent can be up to 70 weight percent (e.g., from about 20 to about 70 weight percent; from about 20 to about 50 weight percent; from about 30 to about 50 weight percent; or from about 40 to about 50 weight percent), but is, in some embodiments, from 20 to 50 weight percent, said weight percent being based on the total weight of components in the hydrosilylation reaction. The solvent used during the hydrosilylation reaction can be subsequently removed from the resulting product by various known methods.

The linear block having repeating units of the formula B-[AB]$_n$ is prepared by a hydrosilylation reaction, wherein Si—H units on a diorganopolysiloxane of the formula [$R^1_2SiO_{2/2}$] (ingredient B) react with the unsaturated aliphatic hydrocarbon group of a divalent organic group comprising at least one polyether (ingredient A) to form an Si—C bond. The reaction may be conducted under those conditions known in the art for effecting hydrosilylations reactions.

Additional components can be added to the hydrosilylation reaction, which are known to enhance such reactions. These components include salts such as sodium acetate which have a buffering effect in combination with platinum catalysts.

The amount of ingredients A and B used to prepare the linear block having repeating units of the formula B-[AB]$_n$ may vary, depending on the molar amount of Si—H present on ingredient B and molar amounts of unsaturated groups present on ingredient A in the reaction. In some embodiments, the amounts of A and B are selected to ensure a molar excess of Si—H units from ingredient B to the unsaturated groups of ingredient A, which results in a linear block having repeating units of the formula B-[AB]$_n$ having terminal Si—H units (i.e., where $R^3$=H).

E) the Organosiloxane Resins

The organosiloxane resins suitable as component b) in the process for preparing resin-linear organosiloxane block copolymers have the average formula $[R^2{}_2R^3SiO_{1/2}]_a$ $[R^2R^3SiO_{2/2}]_b$ $[R^3SiO_{3/2}]_c$ $[R^2SiO_{3/2}]_d$ $[SiO_{4/2}]_e$, wherein each $R^2$ and $R^3$ are as defined above; and the subscripts a, b, c, d, and e represent the mole fraction of each siloxy unit present in the organosiloxane resin and range as follows: a is about 0 to about 0.7 or about 0 to about 0.3; b is about 0 to about 0.3 or about 0 to about 0.2; c is about 0 to about 0.8 or about 0 to about 0.3; d is about 0 to about 0.9 or about 0.4 to about 0.9; e is about 0 to about 0.7 or about 0 to about 0.4; with the provisos that a+b+c≥0, c+d+e≥0.6, and a+b+c+d+e≈1.

The organosiloxane resin may contain any amount and combination of other M, D, T, and Q siloxy units, provided the organosiloxane resin contains at least 60 mole % of $[R^2SiO_{3/2}]$ (T units) and/or $[SiO_{4/2}]$ (Q units) siloxy units, alternatively the organosiloxane resin contains at least 70 mole % of $[R^2SiO_{3/2}]$ and/or $[SiO_{4/2}]$ siloxy units, at least 80 mole % of $[R^2SiO_{3/2}]$ and/or $[SiO_{4/2}]$ siloxy units, alternatively the organosiloxane resin contains at least 90 mole % of $[R^2SiO_{3/2}]$ and/or $[SiO_{4/2}]$ siloxy units, or alternatively the organosiloxane resin contains at least 95 mole % of $[R^2SiO_{3/2}]$ and/or $[SiO_{4/2}]$ siloxy units. In some embodiments, the organosiloxane resin contains from about 60 to about 100 mole % of $[R^2SiO_{3/2}]$ and/or $[SiO_{4/2}]$ siloxy units, e.g., from about 60 to about 95 mole % of $[R^2SiO_{3/2}]$ and/or $[SiO_{4/2}]$ siloxy units, from about 60 to about 85 mole % of $[R^2SiO_{3/2}]$ and/or $[SiO_{4/2}]$ siloxy units, from about 80 to about 95 mole % of $[R^2SiO_{3/2}]$ and/or $[SiO_{4/2}]$ siloxy units or from about 90 to about 95 mole % of $[R^2SiO_{3/2}]$ and/or $[SiO_{4/2}]$ siloxy units. Organosiloxane resins useful as component b) include those known as "silsesquioxane" resins and "MQ" resins including MQ resins where a portion of the M units contain an $R^3$ group as defined herein. MQ resins such as $M^HQ$ or $M^{Vi}Q$, where "Vi" refers broadly to a moiety comprising a vinyl group, include, but are not limited to those disclosed in U.S. Pat. No. 2,857,356, which is incorporated by reference as if fully set forth herein. The '356 patent discloses a method for the preparation of an MQ resin by the cohydrolysis of a mixture of an alkyl silicate and a hydrolyzable trialkylsilane, and an organopolysiloxane with water.

At each occurrence, each $R^2$ in the above organosiloxane resin is independently a $C_1$ to $C_{20}$ hydrocarbyl (e.g., $C_1$ to $C_{10}$ hydrocarbyl) free of aliphatic unsaturation, where the hydrocarbyl group may independently be an alkyl, aryl, or alkylaryl group. Each $R^2$, at each occurrence, may independently be a $C_1$ to $C_{20}$ (e.g., $C_1$ to $C_{10}$ hydrocarbyl) alkyl group, alternatively each $R^2$, at each occurrence, may independently be a $C_1$ to $C_8$ alkyl group. Alternatively, at each occurrence, each $R^2$ may independently be a $C_1$ to $C_6$ alkyl group such as methyl, ethyl, propyl, butyl, pentyl, or hexyl. Alternatively, at each occurrence, each $R^2$ may independently be methyl. Each $R^2$, at each occurrence, may independently be an aryl group, such as phenyl, naphthyl or an anthryl group. Alternatively, at each occurrence, each $R^2$ may independently be any combination of the aforementioned alkyl or aryl groups. Alternatively, at each occurrence, each $R^2$ may independently be phenyl or methyl, such that, in some embodiments, each disiloxy unit may have two alkyl groups (e.g., two methyl groups); two aryl groups (e.g., two phenyl groups); or an alkyl (e.g., methyl) and an aryl group (e.g., phenyl).

The weight average molecular weight ($M_W$) of the organosiloxane resin is not limiting, but, in some embodiments, ranges from 1000 to 10000, or alternatively 1500 to 5000 g/mole.

The organosiloxane resins selected as component b) also contain siloxy units selected from those having a formula $[R^2{}_2R^3SiO_{1/2}]$, $[R^2R^3SiO_{2/2}]$, $[R^3SiO_{3/2}]$, or a combination of these, wherein $R^3$ is H or $R^4$ as defined herein. As discussed above, the presence of siloxy units containing the $R^3$ group in the organosiloxane resin provides a reactive substituent for the hydrosilylation reaction in step I). In some embodiments, when $R^3$ is H in the siloxy units on the organosiloxane resin, $R^3$ on the linear organosiloxane may be an $R^4$ group containing an unsaturated aliphatic bond, and vice versa.

The above formulae and related formulae using mole fractions, as used herein to describe the present organosiloxanes, does not indicate structural ordering of the various siloxy units in the copolymer. Rather, this formula is meant to provide a convenient notation to describe the relative amounts of the siloxy units in the copolymer, as per the mole fractions described herein via the subscripts. The mole fractions of the various siloxy units in the present organosiloxanes, as well as the silanol content, may be readily determined by $^{29}$Si NMR techniques.

Representative, non-limiting examples of Si—H-containing organosiloxane resins (i.e., where $R^3$ is H) of the above formula include, but are not limited to:

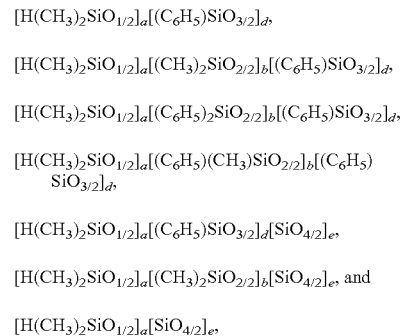

where the subscripts a, b, c, d, and e are as defined herein. When using such Si—H functional organosiloxane resins, the linear organosiloxane selected as component a) would contain a terminal unsaturated group (i.e., $R^3$ in the component a) formula would be an $R^4$ group).

Representative, non-limiting examples of organosiloxane resins containing an unsaturated aliphatic bond (i.e., $R^3$ is $R^4$) of the above formula include:

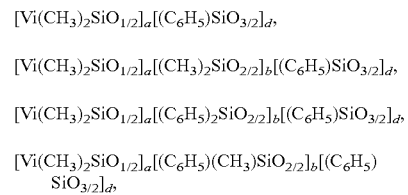

$[Vi(CH_3)_2SiO_{1/2}]_a[(C_6H_5)SiO_{3/2}]_d[SiO_{4/2}]_e$, $[Vi(CH_3)_2SiO_{1/2}]_a[(CH_3)_2SiO_{2/2}]_b[SiO_{4/2}]_e$, and $[Vi(CH_3)_2SiO_{1/2}]_a[SiO_{4/2}]_e$, where the subscripts a, b, c, d, and e are as defined herein and "Vi" refers broadly to a moiety comprising a vinyl group (i.e., a $H_2C=CH—$ group). When using these organosiloxane resins, the linear organosiloxane selected as component a) should contain a terminal Si—H group (i.e., $R^3$ in the component a) formula would be H).

One skilled in the art recognizes that organosiloxane resins containing such high amounts of $[R^2SiO_{3/2}]$ siloxy units may have a certain concentration of Si—OZ where Z may be hydrogen (i.e., silanol) or an alkyl group (so that OZ is an alkoxy group). The Si—OZ content as a mole percentage of all siloxy groups present on the organosiloxane resin may be readily determined by $^{29}Si$ NMR. The concentration of the OZ groups present on the organosiloxane resin may vary, as dependent on the mode of preparation, and subsequent treatment of the resin. In some embodiments, the silanol (Si—OH) content of organosiloxane resins suitable for use in the present process will have a silanol content of at most 25 mole %, alternatively of at most 20 mole %, alternatively at most 15 mole %, alternatively at most 10 mole %, or alternatively at most 5 mole %. In other embodiments, the silanol content is from about 0.5 mole % to about 25 mole %, e.g., from about 5 mole % to about 25 mole %, from about 5 mole % to about 10 mole %, from about 10 mole % to about 25 mole %, from about 5 mole % to about 15 mole % or from about 5 mole % to about 20 mole %.

One skilled in the art further recognizes that organosiloxane resins containing such high amounts of $[R^2SiO_{3/2}]$ siloxy units and silanol contents may also retain water molecules, especially in high humidity conditions. Thus, it is often beneficial to remove excess water present on the resin by "drying" the organosiloxane resin prior to reacting in step I). This may be achieved by dissolving the organosiloxane resin in an organic solvent, heating to reflux, and removing water by separation techniques (for example, Dean Stark trap or equivalent process).

Organosiloxane resins having the formula, $[R^2{}_2R^3SiO_{1/2}]_a[R^2R^3SiO_{2/2}]_b[R^3SiO_{3/2}]_c[R^2SiO_{3/2}]_d[SiO_{4/2}]_e$, and processes for their preparation are known in the art.

Organosiloxane resins containing at least 60 mole % of $[R^2SiO_{3/2}]$ or $[SiO_{4/2}]$ siloxy units, and at least two siloxy units selected from those having a formula $[R^2{}_2R^3SiO_{1/2}]$, $[R^2R^3SiO_{2/2}]$, $[R^3SiO_{3/2}]$, or a combination of these, and methods for preparing them are known in the art. In some embodiments, they are prepared by hydrolyzing an organosilane having three hydrolyzable groups on the silicon atom, such as a halogen or an alkoxy group in an organic solvent. A representative example for the preparation of a silsesquioxane resin may be found in U.S. Pat. No. 5,075,103. Furthermore, many organosiloxane resins are available commercially and sold either as a solid (flake or powder), or dissolved in an organic solvent. Suitable, non-limiting, commercially available organosiloxane resins useful as component b) include; Dow Corning® 217 Flake Resin, 233 Flake, 220 Flake, 249 Flake, 255 Flake, Z-6018 Flake (Dow Corning Corporation, Midland Mich.). It should be mentioned however, that such resins would have to be modified to include a Si—H bond or unsaturated groups, such as vinyl groups. Method for modifying such commercially available resins are known in the art.

The amounts of a) and b) used in the reaction of step I) are selected to provide the resin-linear organosiloxane block copolymer with 40 to 90 mole % of disiloxy units $[R^1{}_2SiO_{2/2}]$ and 10 to 60 mole % of trisiloxy units $[R^2SiO_{3/2}]$. The mole % of dilsiloxy and trisiloxy units present in components a) and b) may be readily determined using $^{29}Si$ NMR techniques. The starting mole % then determines the mass amounts of components a) and b) used in step I).

In some embodiments, the amounts of components a) and b) used in step I) are selected to provide a Si—H/unsaturated bond ratio, depending on the molar quantity of Si—H units and unsaturated bonds present in the components. In some embodiments, the molar ratio of Si—H/unsaturated bonds may vary from 10/1 to 1/10 (e.g., 8:1 to 1:8; 7:1 to 1:7; 6:1 to 1:6; 5:1 to 1:5; 4:1 to 1:4; 3:1 to 1:3; 2:1 to 1:2; and 1:1). In certain embodiments, the molar ratio of Si—H/unsaturated bonds provides a molar excess of Si—H units in the reaction so as to ensure Si—H units remain on the formed resin-linear organosiloxane block copolymer of step I). In one embodiment, the molar ratio of Si—H/unsaturated bonds varies from 10/1 to 1.5/1, e.g., 7:1, 6:1, 5:1, 3:1, 2:1 or 1.5:1.

In some embodiments, the amounts of components a) and b) are selected to ensure that a sufficient amount of the organosiloxane resin is added such that a majority (e.g., greater than 75%, greater than 80%, greater than 90%; greater than 95%; or greater than 99%; or from about 75% to about 95%, from about 80% to about 90%, or from about 75% to about 85%) of linear organosiloxane added in step I) react with the resin. These amounts may be calculated based on the molar quantities of Si—H and unsaturated groups present initially on components a) and b). In some embodiments these amounts are selected to allow at least 95 weight percent of the linear organosiloxane added in step I) to be incorporated into the resin-linear organosiloxane block copolymer formed in step I).

In one embodiment of the process, the amounts and selection of components a) and b) used in step I) are such that the resulting resin-linear organopolysiloxane block copolymer has negligible or no residual Si—H units. In other embodiments of the process, the amounts and selection of components a) and b) used in step I) are such that the resulting resin-linear organopolysiloxane block copolymer has negligible or no residual aliphatic unsaturation.

The reaction conditions for reacting the aforementioned a) linear organosiloxane with the b) organosiloxane resin are not limited. Various non-limiting embodiments and reaction conditions are described in the Examples below. In some embodiments, the a) linear organosiloxane and the b) organosiloxane resin are reacted at room temperature. In other embodiments, a) and b) are reacted at temperatures that exceed room temperature and that range up to about 50, 75, 100, or even up to 150° C. Alternatively, a) and b) can be reacted together at reflux of the solvent. In still other embodiments, a) and b) are reacted at temperatures that are below room temperature by 5, 10, or even more than 10° C. In still other embodiments a) and b) react for times of 1, 5, 10, 30, 60, 120, or 180 minutes, or even longer. In some embodiments, a) and b) are reacted under an inert atmosphere, such as nitrogen or a noble gas. Alternatively, a) and b) may be reacted under an atmosphere that includes some water vapor and/or oxygen. Moreover, a) and b) may be reacted in any size vessel and using any equipment including mixers, vortexers, stirrers, heaters, etc. In other embodiments, a) and b) are reacted in one or more organic solvents which may be polar or non-polar, such as the representative solvents mentioned above. The amount of the organosiloxane resin dissolved in the organic solvent may vary, but, in some embodiments, the amount should be selected to minimize the chain extension of the linear organosiloxane or pre-mature condensation of the organosiloxane resin.

The order of addition of components a) and b) may vary. In some embodiments, the linear organosiloxane is added to a solution of the organosiloxane resin dissolved in the organic solvent. In other embodiments, the organosiloxane resin is added to a solution of the linear organosiloxane dissolved in the organic solvent.

The progress of the reaction in step I), and the formation of the resin-linear organosiloxane block copolymer, may be monitored by various analytical techniques, such as GPC, IR, or $^{29}$Si NMR. In some embodiments, the reaction in step I) is allowed to continue until at least 95 weight percent (e.g., at least 96%, at least 97%, at least 98%, at least 99% or 100%) of the linear organosiloxane added in step I) is incorporated into the resin-linear organosiloxane block copolymer.

Step II) of the present process involves further reacting the resin-linear organosiloxane block copolymer from step I) to crosslink the $[R^2SiO_{3/2}]$ or $[SiO_{4/2}]$ siloxy units of the resin-linear organosiloxane block copolymer to increase the molecular weight of the resin-linear organosiloxane block copolymer by at least 50%, alternatively by at least 60%, alternatively by 70%, alternatively by at least 80%, alternatively by at least 90%, or alternatively by at least 100%. In some embodiments, step II) of the present process involves further reacting the resin-linear organosiloxane block copolymer from step I) to crosslink the $[R^2SiO_{3/2}]$ or $[SiO_{4/2}]$ siloxy units of the resin-linear organosiloxane block copolymer to increase the molecular weight of the resin-linear organosiloxane block copolymer from about 50% to about 100%, e.g., from about 60% to about 100%, from about 70% to about 100%, from about 80% to about 100% or from about 90% to about 100%.

It is believed that the reaction of step II) crosslinks the $[R^2SiO_{3/2}]$ and/or $[SiO_{4/2}]$ blocks of the resin-linear organosiloxane block copolymer formed in step I), which may increase the average molecular weight of the block copolymer. It is also possible that the crosslinking of the $[R^2SiO_{3/2}]$ or $[SiO_{4/2}]$ blocks provides the block copolymer with an aggregated concentration of $[R^2SiO_{3/2}]$ or $[SiO_{4/2}]$ blocks, which ultimately may help to form "nano-domains" in solid compositions of the block copolymer. In other words, this aggregated concentration of $[R^2SiO_{3/2}]$ or $[SiO_{4/2}]$ blocks may phase separate when the block copolymer is isolated in a solid form such as a film or cured coating. The aggregated concentration of $[R^2SiO_{3/2}]$ or $[SiO_{4/2}]$ block within the block copolymer and subsequent formation of "nano-domains" in the solid compositions containing the block copolymer, may provide for enhanced optical clarity of these compositions as well as the other physical property benefits associated with these materials.

The crosslinking reaction in step II) may be accomplished via a variety of chemical mechanisms and/or moieties. For example, crosslinking of non-linear blocks within the block copolymer may result from the condensation of residual silanol groups present in the non-linear blocks of the copolymer and/or via hydrosylilation between, e.g., Si—H bonds and $R^4$ groups remaining unreacted on the non-linear blocks. Crosslinking of the non-linear blocks within the block copolymer may also occur between "free resin" components and the non-linear blocks via silanol condensation and/or hydrosilylation. "Free resin" components may be present in the block copolymer compositions as a result of using an excess amount of an organosiloxane resin during the preparation of the block copolymer. The free resin component may crosslink with the non-linear blocks by condensation of the residual silanol groups present on the non-blocks and on the free resin. The free resin may provide crosslinking by reacting with lower molecular weight compounds added as crosslinkers. The free resin, when present, may be present in an amount of from about 10% to about 20% by weight of the organosiloxane block copolymers of the embodiments described herein, e.g., from about 15% to about 20% by weight organosiloxane block copolymers of the embodiments described herein. The free resin may provide crosslinking by reacting with lower molecular weight compounds added as crosslinkers.

Suitable crosslinkers may be selected from those having the formula $R^1_q R^3_{(3-q)} SiO(R^1_2 SiO_{2/2})_r SiR^3_{(3-q)} OR^1_q$ wherein each $R^1$ is as defined herein; r varies from 0 to 50 (e.g., about 10 to about 50 D units; about 20 to about 50 D units; about 5 to about 40 D units; or about 10 to about 40 D units), alternatively 0 to 10, alternatively 0 to 5, alternatively r is 0; q is 0, 1, or 2, alternatively q is 2; $R^3$ is H or $R^4$, as each term is defined herein. In some embodiments, the crosslinker is added as an additional component in step II.

In some embodiments, when $R^3$ is H on both components a) and b), $R^3$ may be, e.g., a $C_2$ to $C_{12}$ hydrocarbyl having at least one aliphatic unsaturated bond on the crosslinker. In other embodiments, if $R^3$ is a $C_2$ to $C_{12}$ hydrocarbyl having at least one aliphatic unsaturated bond on components a) and b), then $R^3$ is H on the crosslinker. The amount of crosslinker added in step I) in some embodiments may vary, but is selected, in some embodiments, by molar stoichiometry to provide an amount such that the crosslinker may be substantially (e.g., completely) consumed.

Thus, the crosslinker may contain either Si—H units (when $R^3$=H) or contain an unsaturated group (when $R^3$=$R^4$). As such, the crosslinker may react with the linear-resin organosiloxane block copolymer formed in step I via a hydrosilylation reaction. If the resin-linear organosiloxane block copolymer from step I) contains residual Si—H units, the crosslinker in step II selected would contain an $R^4$ group to enable the hydrosilylation to proceed. Conversely, if the resin-linear organosiloxane block copolymer from step I) contains residual unsaturated groups, the crosslinker in step II selected would contain Si—H units to enable the hydrosilylation to proceed.

In some embodiments, the crosslinker is tetramethyldisiloxane $H(CH_3)_2SiOSi(CH_3)_2H$, e.g., when excess unsaturated groups remain on the resin-linear organosiloxane block copolymer from step I).

In a further embodiment, the crosslinker is divinyltetramethyldisiloxane $(H_2C=CH)(CH_3)_2SiOSi(CH_3)_2(HC=CH_2)$ e.g., when excess Si—H units remain on the resin-linear organosiloxane block copolymer from step I).

In other embodiments, an organosilane having the formula $R^6_q SiX_{4-q}$ may be added as a crosslinker during step II), in addition to or in place of a crosslinker of the formula $R^1_q R^3_{(3-q)} SiO(R^1_2 SiO_{2/2})_m SiR^3_{(3-q)} R^1_q$. In the organosilane having the formula $R^6_q SiX_{4-q}$, $R^6$ is a $C_1$ to $C_8$ hydrocarbyl or a $C_1$ to $C_8$ halogen-substituted hydrocarbyl; X is a hydrolyzable group; and q is 0, 1, or 2. $R^5$ is a $C_1$ to $C_8$ hydrocarbyl or a $C_1$ to $C_8$ halogen-substituted hydrocarbyl, or alternatively $R^6$ is a $C_1$ to $C_8$ alkyl group, or alternatively a phenyl group, or alternatively $R^6$ is methyl, ethyl, or a combination of methyl and ethyl. X is any hydrolyzable group including oximo groups, epoxy groups, carboxy groups, amino groups, amido groups or combinations thereof. Alternatively, the hydrolyzable group may have the formula $R^1C(=O)O—$, $R^1_2C=N—O—$, or $R^1C=N—O—$, where $R^1$ is as defined herein.

In one embodiment, the hydrolyzable group is $H_3CC(=O)O—$ (acetoxy). In another embodiment, the hydrolyzable group is (CH$_3$)(CH$_3$CH$_2$)C=N—O— (methylethylketoximyl). Alternatively X may be a halogen atom, hydroxyl (OH), or an alkoxy group. In one embodiment, the organosilane is an alkyltriacetoxysilane, such as methyltriacetoxysilane, ethyltriacetoxysilane, or a combination of both. Commercially available representative alkyltriacetoxysilanes include ETS-900 (Dow Corning Corp., Midland, Mich.). Other suitable, non-limiting organosilanes useful in some embodiments include; methyl-tris(methylethylketoxime)silane (MTO), methyl triacetoxysilane, ethyl triacetoxysilane, tetraacetoxysilane, tetraoximesilane, dimethyl diacetoxysilane, dimethyl dioximesilane, and methyl tris(methylmethylketoxime)silane.

The amount of organosilane having the formula R$^6_q$SiX$_{4-q}$ when added during step II) may vary, but, in some embodiments, is based on the amount of organosiloxane resin used in the process. The amount of silane used may provide a molar stoichiometry of 2 to 15 mole % of organosilane per moles of Si in the organosiloxane resin, e.g., 2 to 10 mole % of organosilane/moles of Si in the organosiloxane resin; 5 to 15 mole % of organosilane/moles of Si in the organosiloxane resin; 2 to 5 mole % of organosilane/moles of Si in the organosiloxane resin; 10 to 15 mole % of organosilane/moles of Si in the organosiloxane resin; 5 to 10 mole % of organosilane/moles of Si in the organosiloxane resin; or 2 to 12 mole % of organosilane/moles of Si in the organosiloxane resin. Furthermore, the amount of the organosilane having the formula R$^6_q$SiX$_{4-q}$ added during step II) may be controlled, in some embodiments, to ensure a stoichiometry that does not consume all the silanol groups on the organosiloxane block copolymer. In one embodiment, the amount of the organosilane added in step II) may be selected to provide an organosiloxane block copolymer containing 0.5 to 10 mole percent of silanol groups [≡SiOH] (e.g., 0.5 to 5 mole percent silanol groups).

When a solvent is used step I), the solvent may optionally be removed. If the solvent is removed, it may be removed by any known techniques. In some embodiments, the solvent is removed by heating the resin-linear organosiloxane copolymer compositions at elevated temperature, either at atmospheric conditions or under reduced pressures. In some embodiments, not all of the solvent is removed. In some embodiments, at least 20%, at least 30%, at least 40%, or at least 50% of the solvent is removed, e.g., at least 60%, at least 70%, at least 75%, at least 80% or at least 90% of the solvent is removed. In some embodiments, less than 20% of the solvent is removed, e.g., less than 15%, less than 10%, less than 5% or 0% of the solvent is removed. In other embodiments, from about 20% to about 100% of the solvent is removed, e.g., from about 30% to about 90%, from about 20% to about 80%, from about 30 to about 60%, from about 50 to about 60%, from about 70 to about 80% or from about 50% to about 90% of the solvent is removed.

Solid compositions containing the resin-linear organosiloxane block copolymers may be prepared by removing the solvent from the organosiloxane block copolymer compositions as described herein. In one embodiment, a film of the solid compositions containing the organosiloxane block copolymers is formed, and the solvent is allowed to evaporate from the film. Subjecting the films to elevated temperatures, and/or reduced pressures, may accelerate solvent removal and subsequent formation of the solid curable composition. Films may be cast from a solution of the block copolymer in an organic solvent (e.g., benzene, toluene, xylene or combinations thereof) and allowing the solvent to evaporate. Under these conditions, the aforementioned organosiloxane block copolymers can be provided as solutions in an organic solvent containing from about 50 wt % to about 80 wt % solids, e.g., from about 60 wt % to about 80 wt %, from about 70 wt % to about 80 wt % or from about 75 wt % to about 80 wt % solids. In some embodiments, the solvent is toluene. In some embodiments, such solutions may have a viscosity of from about 1500 cSt to about 4000 cSt at 25° C., e.g., from about 1500 cSt to about 3000 cSt, from about 2000 cSt to about 4000 cSt or from about 2000 cSt to about 3000 cSt at 25° C.

Alternatively, the solid compositions may be formed by passing a composition comprising a resin-linear organosiloxane block copolymer through an extruder to remove solvent and provide the solid composition in the form of a ribbon or pellets. Coating operations against a release film could also be used as in slot die coating, knife over roll, rod, or gravure coating. Also, roll-to-roll coating operations could be used to prepare a solid film. In coating operations, a conveyer oven or other means of heating and evacuating the solution can be used to drive off the solvent and obtain the final solid film.

Upon drying or forming a solid, the non-linear blocks of the block copolymer further aggregate together to form "nano-domains." As used herein, "predominately aggregated" means the majority (e.g., greater than 50%; greater than 60%; greater than 75%, greater than 80%, greater than 90%; from about 75% to about 90%, from about 80% to about 90%, or from about 75% to about 85%) of the non-linear blocks of the organosiloxane block copolymer are found in certain regions of the solid composition, described herein as "nano-domains." As used herein, "nano-domains" refers to those phase regions within the solid block copolymer compositions that are phase separated within the solid block copolymer compositions and possess at least one dimension sized from 1 to 100 nanometers. The nano-domains may vary in shape, providing at least one dimension of the nano-domain is sized from 1 to 100 nanometers. Thus, the nano-domains may be regular or irregularly shaped. The nano-domains may be spherically shaped, tubular shaped, and, in some instances, lamellar shaped.

Although not wishing to be bound by any theory, it is possible that the structural ordering of the disiloxy and trisiloxy units in the organosiloxane block copolymer, as described herein, may provide the copolymer with certain unique physical property characteristics when solid compositions of the block copolymer are formed. For example, the structural ordering of the disiloxy and trisiloxy units in the copolymer may provide solid coatings that allow for a high optical transmittance of visible light (e.g., at wavelengths above 350 nm). The structural ordering may also allow the organosiloxane block copolymer to flow and cure upon heating, yet remain stable at room temperature. They may also be processed using lamination techniques. These properties are useful to provide coatings for various electronic articles to improve weather resistance and durability, while providing low cost and easy procedures that are energy efficient.

The present disclosure further relates to solid forms of the aforementioned organosiloxane block copolymers and solid compositions derived from the curable compositions described above comprising the organosiloxane block copolymers.

In a further embodiment, the solid organosiloxane block copolymers as described herein contain a first phase and an incompatible second phase, the first phase containing predominately the disiloxy units [R$^1_2$SiO$_{2/2}$] as defined herein, the second phase containing predominately the trisiloxy units [R$^2$SiO$_{3/2}$] as defined herein, the non-linear blocks being sufficiently aggregated into nano-domains which are incompatible with the first phase.

When solid compositions are formed from the curable compositions of the organosiloxane block copolymer, which may also contain an organosiloxane resin, as described herein, the organosiloxane resin also predominately aggregates within the nano-domains.

The structural ordering of the disiloxy and trisiloxy units in the solid block copolymers of the present disclosure, and characterization of the nano-domains, may be determined explicitly using certain analytical techniques such as Transmission Electron Microscopic (TEM) techniques, Atomic Force Microscopy (AFM), Small Angle Neutron Scattering, Small Angle X-Ray Scattering, and Scanning Electron Microscopy.

Alternatively, the structural ordering of the disiloxy and trisiloxy units in the block copolymer, and formation of nano-domains, may be implied by characterizing certain physical properties of coatings resulting from the present organosiloxane block copolymers. For example, the present organosiloxane copolymers may provide coatings that have an optical transmittance of visible light greater than 95%. One skilled in the art recognizes that such optical clarity is possible (other than refractive index matching of the two phases) only when visible light is able to pass through such a medium and not be diffracted by particles (or domains as used herein) having a size greater than 150 nanometers. As the particle size, or domains further decreases, the optical clarity may be further improved. Thus, coatings derived from the present organosiloxane copolymers may have an optical transmittance of visible light of at least 95%, e.g., at least 96%; at least 97%; at least 98%; at least 99%; or 100% transmittance of visible light. As used herein, the term "visible light" includes light with wavelengths above 350 nm.

In one embodiment, the solid compositions of the organosiloxane block copolymers may be considered as "melt processable." In some embodiments, the solid compositions, such as a coating formed from a film of a solution containing the organosiloxane block copolymers, exhibit fluid behavior at elevated temperatures, that is upon "melting." The "melt processable" features of the solid compositions of the organosiloxane block copolymers may be monitored by measuring the "melt flow temperature" of the solid compositions, that is when the solid composition demonstrates liquid behavior. The melt flow temperature may specifically be determined by measuring the storage modulus (G'), loss modulus (G") and tan delta (tan δ) as a function of temperature storage using commercially available instruments. For example, a commercial rheometer (such as TA Instruments' ARES-RDA with 2KSTD standard flexular pivot spring transducer, with forced convection oven) may be used to measure the storage modulus (G'), loss modulus (G") and tan delta as a function of temperature. Test specimens (e.g., 8 mm wide, 1 mm thick) may be loaded in between parallel plates and measured using small strain oscillatory rheology while ramping the temperature in a range from 25° C. to 300° C. at 2° C./min (frequency 1 Hz). In some embodiments, the FLOW of the solid compositions will also correlate to the glass transition temperature of the non-linear segments (i.e., the resin component) in the organosiloxane block copolymer.

In a further embodiment, the solid compositions may be characterized as having a melt flow temperature ranging from 25° C. to 200° C., alternatively from 25° C. to 160° C., or alternatively from 50° C. to 160° C.

The solid compositions containing the organosiloxane block copolymers have a storage modulus (G') at 25° C. of at least 1 KPa, alternatively storage modulus (G') at 25° C. may range from 0.01 MPa to 500 MPa.

In one embodiment, the solid compositions containing the present amphiphilic resin-linear organosiloxane block copolymers have improved water vapor permeation rates (WVPR), as compared to similar copolymers that do not contain polyether units in its structure. In this embodiment, solid films of resin-linear organosiloxane block copolymer compositions having a thickness of 0.3-0.4 mm have WVPR of at least 30 g/m$^2$·day, alternatively at least 40 g/m$^2$·day, alternatively at least 50 g/m$^2$·day, alternatively at least 60 g/m$^2$·day. In some embodiments, solid films of resin-linear organosiloxane block copolymer compositions having a thickness of 0.3-0.4 mm have WVPR of from about 30 g/m$^2$·day to about 500 g/m$^2$·day, e.g., from about 30 g/m$^2$·day to 60 g/m$^2$·day, from about 30 g/m$^2$·day to about 50 g/m$^2$·day, from about 50 g/m$^2$·day to about 100 g/m$^2$·day, from about 40 g/m$^2$·day to about 75 g/m$^2$·day, from about 75 g/m$^2$·day to about 250 g/m$^2$·day, from about 100 g/m$^2$·day to about 250 g/m$^2$·day, from about 200 g/m$^2$·day to about 350 g/m$^2$·day or from about 250 g/m$^2$·day to about 500 g/m$^2$·day.

The term "about," as used herein, can allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

Embodiments of the invention described and claimed herein are not to be limited in scope by the specific embodiments herein disclosed, since these embodiments are intended as illustration of several aspects of the disclosure. Any equivalent embodiments are intended to be within the scope of this disclosure. Indeed, various modifications of the embodiments in addition to those shown and described herein will become apparent to those skilled in the art from the foregoing description. Such modifications are also intended to fall within the scope of the appended claims.

The Abstract is provided to allow the reader to quickly ascertain the nature of the technical disclosure. It is submitted with the understanding that it will not be used to interpret or limit the scope or meaning of the claims.

EXAMPLES

The following examples are included to demonstrate specific embodiments of the invention. However, those of skill in the art should, in light of the present disclosure, appreciate that many changes can be made in the specific embodiments which are disclosed and still obtain a like or similar result without departing from the spirit and scope of the invention. All percentages are in wt %. All measurements were conducted at 23° C. unless indicated otherwise.

Example 1

72 wt. % PDMS, 0 wt. % EO, 28 wt. %
Silsesquioxane-$T_g$ 22° C.

A 1 L 4 neck round bottom flask was charged with 150 dp Si—H terminated polydimethylsiloxane (PDMS; Dow Corning; 115.2 g, 0.0206 mols Si—H), toluene (Fisher Scientific, 221.6 g), and a 70.9 wt. % solution of vinyl functional silsesquioxane resin (63.2 g solution, 44.81 g solids, 0.0557 moles vinyl) in toluene. The resin had a structure of $M^{Vi}_{0.14}T^{Pr}_{0.26}T^{Ph}_{0.59}$ and an $M_W$ of 2470. The flask was equipped with a stir paddle, thermometer, and a water-cooled condenser. A nitrogen blanket was applied. A 2540 ppm solution (1.18 g) of Pt(IV) dissolved in toluene was added at room temperature. The reaction mixture was heated at reflux (110° C.) for 1 hour. It was cooled to near room temperature and then a solution (2.59 g, 0.00386 mols Si—H) of 10 wt. % tetramethyldisiloxane (Dow Corning) in toluene was added. The reaction mixture was heated at reflux (110° C.) for 2 hours. Cast films (made by pouring the solution in a chase and evaporating the solvent overnight at room temperature) were optically clear.

Example 2

54 wt. % PDMS, 18 wt. % EO, 28 wt. % Silsesquioxane-$T_g$ 8° C.

A 1 L 4 neck round bottom flask was loaded with Si—H terminated PDMS (Dow Corning; 86.88 g, 0.128 moles Si—H), dimethallyl terminated polyethylene oxide (Clariant DMAL 500, 28.32 g, 0.114 moles Vi), toluene (Fisher Scientific, 172.8 g), and a 1 wt. % solution (2.32 g) of tocopherols (mixed tocopherols 95—DSM Nutritional Products Inc.) dissolved in toluene. The flask was equipped with a stir paddle, thermometer, and a water-cooled condenser. A nitrogen blanket was applied. A 2350 ppm solution (0.93 g) of Pt(IV) dissolved in toluene was added at room temperature. Reaction mixture was mixed at room temperature for 2.5 hours. A 65.0 wt. % solution of vinyl functional silsesquioxane resin (68.92 g solution, 44.80 g solids, 0.0548 moles vinyl) in toluene was added at room temperature along with additional toluene (43.08 g). The resin had a structure of $M^{Vi}_{0.14}T^{Pr}_{0.26}T^{Ph}_{0.59}$ and an $M_W$ of 1870. The reaction mixture was heated at reflux (110° C.) for 1 hour. It was cooled to near room temperature and then a solution (4.39 g, 0.0327 moles Si—H) of 50 wt. % tetramethyldisiloxane (Dow Corning) in toluene was added. The reaction mixture was heated at reflux (110° C.) for 2 hours. Cast films (made by pouring the solution in a chase and evaporating the solvent overnight at room temperature) were optically clear.

Example 3

54 wt. % PDMS, 18 wt. % EO, 28 wt. % Silsesquioxane-$T_g$ 43° C.

A 1 L 4 neck round bottom flask was loaded with Si—H terminated PDMS (Dow Corning; 86.88 g, 0.128 moles Si—H), dimethallyl terminated polyethylene oxide (Clariant DMAL 500, 28.32 g, 0.114 mols Vi), toluene (Fisher Scientific, 172.8 g), and a 1 wt. % solution (2.32 g) of tocopherols (mixed tocopherols 95—DSM Nutritional Products Inc.) dissolved in toluene. The flask was equipped with a stir paddle, thermometer, and a water-cooled condenser. A nitrogen blanket was applied. A 2160 ppm solution (1.01 g) of Pt(IV) dissolved in toluene was added at room temperature. Reaction mixture was mixed at room temperature for 2.5 hours. A 70.4 wt. % solution of vinyl functional silsesquioxane resin (63.64 g solution, 44.80 g solids, 0.0542 moles vinyl) in toluene was added at room temperature along with additional toluene (48.36 g). The resin had a structure of $M^{Vi}_{0.14}T^{Pr}_{0.16}T^{Ph}_{0.69}$ and an Mw of 2130. The reaction mixture was heated at reflux (110° C.) for 1 hour. It was cooled to near room temperature and then a solution (5.40 g, 0.0201 moles Si—H) of 25 wt. % tetramethyldisiloxane (Dow Corning) in toluene was added. The reaction mixture was heated at reflux (110° C.) for 2 hours. Cast films (made by pouring the solution in a chase and evaporating the solvent overnight at room temperature) were optically clear.

Example 4

47.4 wt. % PDMS, 24.6 wt. % EO, 28.0 wt. % Silsesquioxane-$T_g$ 62° C.

A 500 mL 3 neck round bottom flask was loaded with Si—H terminated PDMS (Dow Corning; 23.73 g, 0.0349 mols Si—H), diallyl terminated polyethylene oxide (NOF AA-800, 12.29 g, 0.0306 mols Vi), toluene (Fisher Scientific, 171.4 g), and a 1 wt. % solution (0.83 g) of tocopherols (mixed tocopherols 95—DSM Nutritional Products Inc.) dissolved in toluene. The flask was equipped with a stir paddle, thermometer, and a water-cooled condenser. A nitrogen blanket was applied. A 1670 ppm solution (0.93 g) of Pt(IV) in toluene was added at room temperature. Reaction mixture was mixed at room temperature for 2 hours. A 70.1 wt. % solution of vinyl functional silsesquioxane resin (19.97 g solution, 14.00 g solids, 0.0182 moles vinyl) in toluene was added at room temperature along with additional toluene (8.97 g). The resin had a structure of $M^{Vi}_{0.15}T^{Ph}_{0.75}Q_{0.08}$ and an Mw of 2460. The reaction mixture was heated at 65° C. for 3.5 hrs. Next a solution (4.62 g, 0.00688 moles Si—H) of 10 wt. % tetramethyldisiloxane (Dow Corning) in toluene was added. The reaction mixture was heated at 65° C. for 1 hour.

Example 5

54.2 wt. % PDMS, 17.8 wt. % EO, 28.0 wt. % Silsesquioxane-$T_g$ 140° C.

A 500 mL 3 neck round bottom flask was loaded with Si—H terminated PDMS (Dow Corning; 57.97 g, 0.0859 mols Si—H), dimethallyl terminated polyethylene oxide (Clariant DMAL 500, 19.03 g, 0.0765 moles Vi), toluene (Fisher Scientific, 115.50 g), and a 1 wt. % solution (1.54 g) of tocopherols (mixed tocopherols 95—DSM Nutritional Products Inc.) dissolved in toluene. The flask was equipped with a stir paddle, thermometer, and a water-cooled condenser. A nitrogen blanket was applied. A 2370 ppm solution (0.61 g) of Pt(IV) in toluene was added at room temperature. The reaction mixture was mixed at 30° C. for 3.25 hours. A 12.7 g sample was removed for analysis. A 63.8 wt. % solution of vinyl functional silsesquioxane resin (43.89 g solution, 28.00 g solids, 0.024 moles vinyl) in toluene was added at room temperature along with additional toluene (26.11 g). The resin had a structure of $M^{Vi}_{0.096}T^{Pr}_{0.269}T^{Ph}_{0.538}Q_{0.091}$ and an $M_W$ of 5060. The reaction mixture was heated at 110° C. for 1 hour. Next a solution (2.20 g, 0.00819 moles Si—H) of 25 wt. % tetramethyldisiloxane (Dow Corning) in toluene was added. The reaction mixture was heated at 110° C. for 2 hours.

Example 6

26.2 wt. % PDMS, 13.8 wt. % EO, 60.0 wt. % Silsesquioxane-$T_g$ 140° C.

A 500 mL 4 neck round bottom flask was loaded with Si—H terminated PDMS (Dow Corning 11.5dp PDMS, 23.77 g, 0.0567 moles Si—H), dimethallyl terminated polyethylene oxide (Clariant DMAL 500, 12.56 g, 0.0505 moles Vi), toluene (Fisher Scientific, 54.50 g), and a 1 wt. % solution (0.73 g) of tocopherols (mixed tocopherols 95—DSM Nutritional Products Inc.) dissolved in toluene. The flask was equipped with a stir paddle, thermometer, and a water-cooled condenser. A nitrogen blanket was applied. An 1850 ppm solution (0.37 g) of Pt(IV) in toluene was added at room temperature. Reaction mixture was mixed at 30° C. for 2.5 hours. A 7.56 g sample was removed for analysis. A 63.8 wt. % solution of vinyl functional silsesquioxane resin (78.37 g solution, 50.00 g solids, 0.0429 moles vinyl) in toluene was added at room temperature along with additional toluene (46.63 g). The resin had a structure of $M^{Vi}_{0.096}T^{Pr}_{0.269}T^{Ph}_{0.538}Q_{0.091}$ and an $M_W$ of 5060. The reaction mixture was heated at 110° C. for 1 hour. Next a solution (4.05 g, 0.0151 moles Si—H) of 25 wt. % tetramethyldisiloxane (Dow Corning) in toluene was added. The reaction mixture was heated at 110° C. for 2 hours.

Molecular Weight

The samples were analyzed using THF as the eluent, which is commonly used for silicone polyether samples. The molecular weight averages are relative to polystyrene standards and were determined for the individual peak areas, dropping a vertical between the peaks as the division for integration. The chromatographic equipment consisted of a Waters 2695 Separations Module equipped with a vacuum degasser, and a Waters 2410 differential refractometer. The separation was made with two (300 mm×7.5 mm) Polymer Laboratories PLgel 5 µm mixed-C columns (molecular weight separation range of 200 to 2,000,000ute, preceded by a PLgel 5 µm guard column (50 mm×7.5 mm). The analyses were performed using certified grade THF flowing at 1.0 mL/minute as the eluent, and the columns and detector were both heated to 35° C. The samples were prepared in THF at about 0.5% w/v solids, solvated about three hours with occasional shaking, and filtered through 0.45 µm PTFE syringe filters prior to analysis. An injection volume of 100 µL was used and data was collected for 25 minutes. Data collection and analyses were performed using ThermoLabsystems Atlas chromatography software and Polymer Laboratories Cirrus GPC software. Molecular weight averages were determined relative to a calibration curve (3rd order) created using polystyrene standards covering the molecular weight range of 580-2,300,000.

Rheology

Amphiphilic resin-linears were prepared using an 8 mm stainless steel punch probe. Rheology measurements were taken of materials produced using an ARES S/N816602 rheology instrument. The following program settings were used:
Frequency: 1 rad/sec
Strain Limits: min-0.002262% max-226.2446%
AutoStrn: On
Initial Temperature: 25.0° C.
Final Temperature (zone 1): 70.0° C.
Strain (zone 1): 8%
Final temperature (zone 2): 200.0° C.
Strain (zone 2): 10%
Ramp Rate: 2.0° C./min
Time per Measure: 2 sec Thermal Analysis Thermal analysis of reagents and amphiphilic resin-linears was done using a DSC Q2000 V24.2 Build 107 instrument from TA Instruments. Samples of roughly 0.5 g weight, measured using a Mettler Toledo AB135-S/FACT 5-place balance were prepared in aluminum hermetic DSC pans and compared to a reference sample of known weight in the same type of pan. The following program settings were used:
Mass Flow Control Settings: Sample #1-Helium, Flow Rate-25 mL/minute
Calibration Set: 0) LM Tzero He 25 mL/minute Samples were equilibrated at −160° C., and then measurements were taken with a ramp rate of 20° C./min up to 200° C. Measurements were stopped and this cycle was repeated, giving two cycles of measurements.

Water Uptake

Amphiphilic resin-linear samples were prepared by weighing approximately 0.5 g using a Mettler Toledo AE-100 50place balance. The in initial weights were recorded. A 2-inch by 2-inch square of wire mesh was then inserted into a dental mixer cup size so that each corner was at the level of the beginning of the screw-cap threads. The sample was placed onto the mesh and the cup filled with deionized water to the level of the threads. The cup was then sealed and left for 24 hours. The sample was removed, any visible water on the surface removed, and re-weighed. This final weight was used to calculate a weight percent of water uptake for the samples per gram of sample.

Water Vapor Permeability

Samples of amphiphilic resin-linear were cast to a thickness of 0.3-0.4 mm. These films were cut into circles of 45 mm diameter. Payne cups of internal diameter 35 mm (A) were filled with 0.5 g of deionized water and fitted with the film. The entire payne sup setup was weighed using a Mettler Toledo AG204 6-place balance for an initial weight and placed in a constant climate room with temperature set at 18° C. and relative humidity set at 52%. These cups were re-weighed at two-hour intervals over a span of 26 hours to determine the amount of water vapor evaporating through the films. These measurements were graphed and the slope of the lines (B) used to determine the final water vapor permeation rate (WVPR) using the following calculation:

$$WVPR\left(\frac{g}{m^2 \cdot day}\right) = \frac{(B) \cdot 24 \text{ hours}}{\pi \cdot \left(\frac{(A)}{2 \cdot 1000 \frac{mm}{m^2}}\right)^2}$$

The WVPR results are shown in Table 1, below.

TABLE 1

| | G' at 25° C., MPa | $T_g$, hard block, ° C. | Water uptake, % | WVPR, g/m²·day | Appearance | Flows > 120° C. |
|---|---|---|---|---|---|---|
| Example 1 0% EO | 0.018 | 22 | 7 | 25 | Optically clear | Yes |
| Example 2 18% EO | 0.011 | 8 | 23 | 72 | Optically clear | Yes |
| Example 3 18% EO | 0.012 | 43 | 20 | 61 | Optically clear | Yes |
| Example 4 25% EO | 0.030 | 62 | | 314 | Optically clear | Yes |

What is claimed is:

1. A resin-linear organosiloxane block copolymer comprising:
  i) a linear block of repeating units having the formula B-[AB]$_n$
  wherein
  B is a diorganopolysiloxane having an average of from 10 to 400 disiloxy units of the formula [R$^1_2$SiO$_{2/2}$]

A is a divalent organic group comprising at least one polyether group, and n is ≥1 ii) a resinous block of repeating units of the formula [$R^2SiO_{3/2}$] arranged in non-linear blocks having a molecular weight of at least 500 g/mol, wherein $R^1$ is independently a $C_1$ to $C_{30}$ hydrocarbyl, $R^2$ is independently a $C_1$ to $C_{20}$ hydrocarbyl, each linear block is linked to at least one non-linear block by a divalent $C_2$ to $C_{12}$ hydrocarbylene group, and the organosiloxane block copolymer has a molecular weight of at least 20,000 g/mole.

2. The resin-linear organosiloxane of claim 1, wherein the linear block has the formula

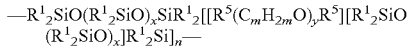

wherein x is ≥0, m is from 2 to 4 inclusive, y is ≥3, n is ≥1, $R^1$ is independently a monovalent hydrocarbon group containing 1 to 30 carbons, and $R^5$ is a divalent hydrocarbon containing 2 to 30 carbons.

3. The resin-linear organosiloxane of claim 2, wherein $R^1$ is methyl, $R^5$ is ethylene, propylene, or isobutylene, and m is 2.

4. The resin-linear organosiloxane of claim 2, wherein $R^2$ is phenyl.

5. A solid composition comprising the resin linear organosiloxane of claim 1.

6. The solid composition of claim 5, wherein the solid composition has a storage modulus (G') at 25° C. of at least 1 KPa.

7. The solid composition of claim 6 having a water vapor permeation rate of at least 30 g/m$^2$·day.

8. The solid composition of claim 5, which is curable.

9. The cured product of the composition of claim 5.

10. A process for preparing a resin linear organosiloxane block copolymer comprising:

I) reacting:

a) a linear organosiloxane of the formula:

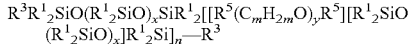

Wherein x is ≥0, m is from 2 to 4 inclusive, y is ≥3, n is ≥1, $R^1$ is independently a $C_1$ to $C_{30}$ hydrocarbyl, $R^5$ is a divalent hydrocarbon containing 2 to 30 carbons, $R^3$ is independently H or $R^4$, wherein $R^4$ is a $C_2$ to $C_{12}$ hydrocarbyl having at least one aliphatic unsaturated bond;

b) an organosiloxane resin having the average formula;

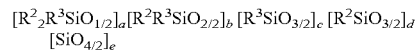

where the subscripts a, b, c, d, and e represent the mole fraction of each siloxy unit present in the organosiloxane resin and range as follows: a may vary from 0 to 0.7, b may vary from 0 to 0.3, c may vary from 0 to 0.8, d may vary from 0 to 0.9, e may vary from 0 to 0.7, with the provisos that a+b+c≥0, c+d+e≥0.6, and a+b+c+d+e≈1, with the proviso at least one $R^3$ substituent is H on either of the linear organosiloxane or organosiloxane resin, and one $R^3$ substituent is $R^4$ on the other organosiloxane, and c) a hydrosilylation catalyst;

to form a resin-linear organosiloxane block copolymer;

wherein the amounts of a) and b) used in step I are selected to provide the resin-linear organosiloxane block copolymer with 10 to 90 mol % of disiloxy units [$R^1_2SiO_{2/2}$] and 10 to 70 mol % of [$R^2SiO_{3/2}$] or [$SiO_{4/2}$] siloxy units, and at least 95 weight percent of the linear organosiloxane added in step I is incorporated into the resin-linear organosiloxane block copolymer.

11. The process of claim 10, further comprising a solvent.

12. The process of claim 10 further comprising:

II) reacting the resin-linear organosiloxane block copolymer from step I) to crosslink the [$R^2SiO_{3/2}$] and/or [$SiO_{4/2}$] siloxy units of the resin-linear organosiloxane block copolymer sufficiently to increase the average molecular weight ($M_w$) of the resin-linear organosiloxane block copolymer by at least 50%.

13. The process of claim 10, wherein $R^1$ is methyl, $R^5$ is ethylene, propylene, or isobutylene, and m is 2.

14. The process of claim 10 wherein $R^2$ is phenyl.

\* \* \* \* \*